P. T. GODSAL.
SMALL ARM.
APPLICATION FILED DEC. 31, 1914.
1,139,268.
Patented May 11, 1915.
5 SHEETS—SHEET 1.
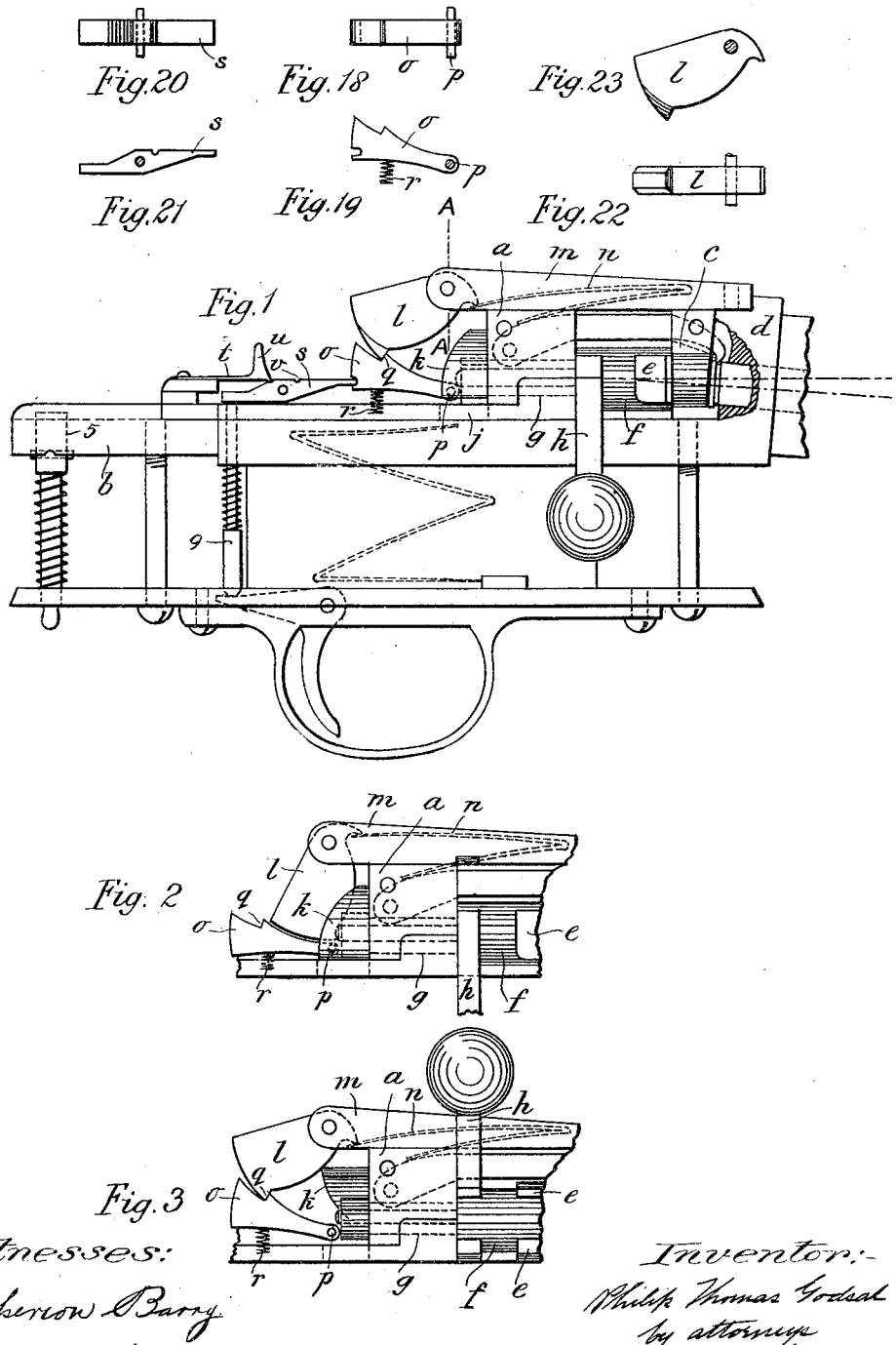

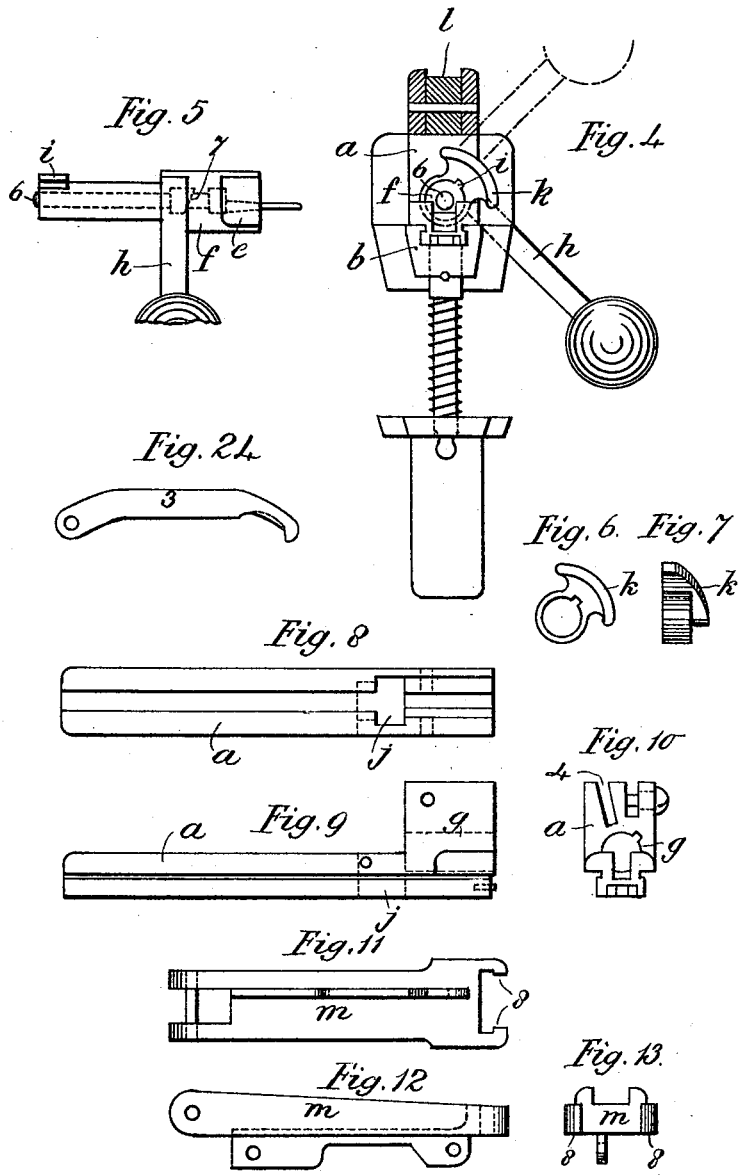

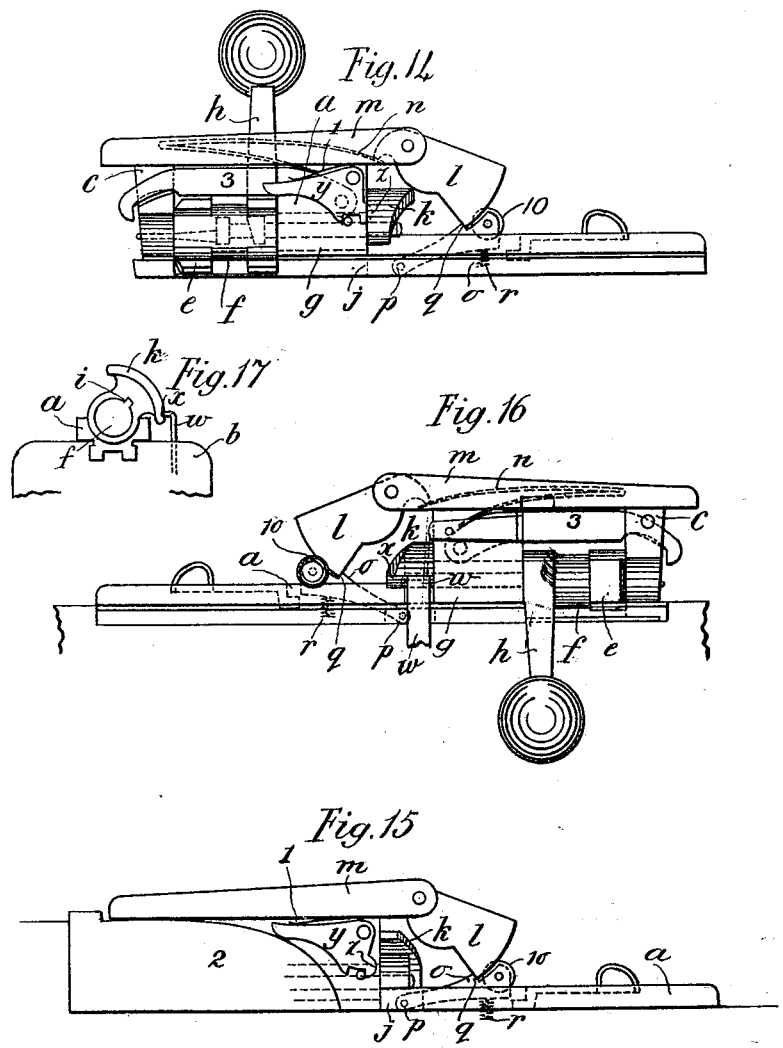

P. T. GODSAL.
SMALL ARM.
APPLICATION FILED DEC. 31, 1914.

1,139,268.

Patented May 11, 1915.
5 SHEETS—SHEET 4.

Witnesses:
Hyperion Barry
F. George Barry

Inventor:—
Philip Thomas Godsal
by attorneys
Brown & Seward

THE NORRIS PETERS CO., PHOTO-LITHO., WASHINGTON, D. C.

UNITED STATES PATENT OFFICE.

PHILIP THOMAS GODSAL, OF ISCOYD PARK, COUNTY OF FLINT, NEAR WHITCHURCH, ENGLAND.

SMALL-ARM.

1,139,268.   Specification of Letters Patent.   Patented May 11, 1915.

Application filed December 31, 1914. Serial No. 879,945.

*To all whom it may concern:*

Be it known that I, PHILIP THOMAS GODSAL, a subject of the King of Great Britain, and resident of Iscoyd Park, Flintshire, near Whitchurch, in the county of Shropshire, England, gentleman, have invented a new and useful Improvement in Small-Arms, of which the following is a specification.

This invention relates to the block-bolt principle of magazine-rifle action in connection with which I have previously obtained British patents beginning with No. 22003 of 1902. Hitherto part of the mechanism has been contained in the bolt while other parts coöperating therewith have been mounted on the body or stationary part of the rifle.

In the arrangement which forms the subject of the present application all the mechanism is contained in the bolt and can be taken off therewith leaving behind on or in the body of the fire arm only the bolt-stop, the ejector and the trigger, if a trigger is used, besides the magazine, the barrel or other non-movable or stationary parts of the rifle.

In carrying out my invention I mount in the bolt carrier a hammer, a cam for cocking the same when the bolt lever is turned and a sear for retaining the hammer in its cocked position, a main spring in the carrier is also provided.

Figure 25:
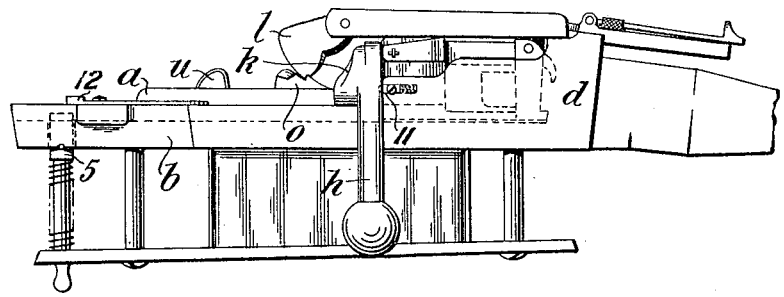
Figure 31:
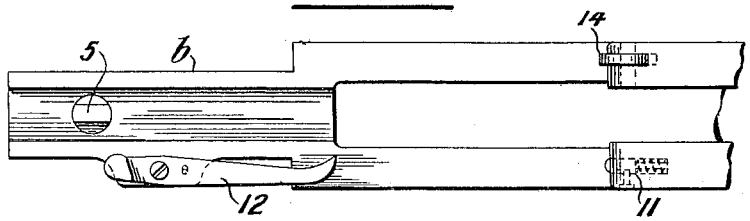
Figure 32:
Figure 33:
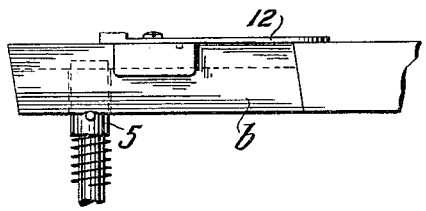
Figure 34:
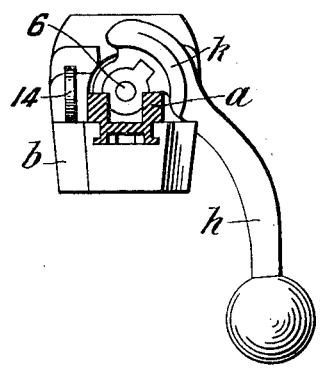
Figure 26:
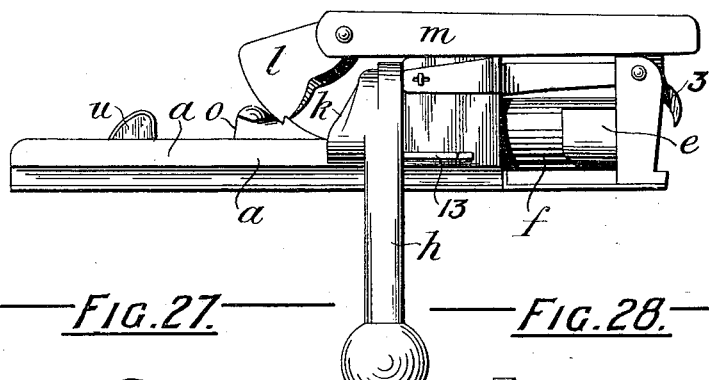
Figure 27:
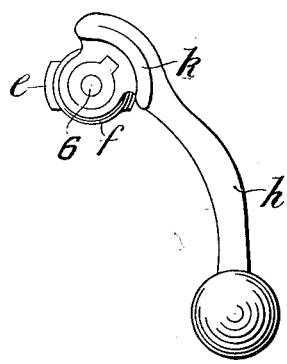
Figure 28:
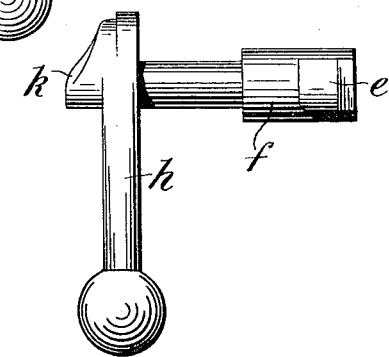
Figure 29:
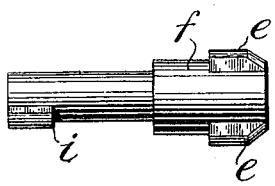
Figure 30:

In the accompanying drawings Figure 1 is a side view of a bolt and the parts with which it is associated constituting the arrangement which forms the subject of the present application the rifle being cocked and ready for discharge. Figs. 2 and 3 are side views of a portion of Fig. 1 showing the parts in different positions viz: immediately after firing and immediately after cocking. Fig. 4 is a section on line A—A of Fig. 1 showing the cam for camming back the hammer. Fig. 5 is a detached side view of the block i. e. the rotatable or locking portion of the bolt, with a rearward extension for supporting and rotating the hammer cam. Figs. 6 and 7 are back and side views of the said cam. Figs. 8 and 9 are top view and side view of the bolt carrier stripped and Fig. 10 is a front end view thereof. Fig. 11 is an underside plan view of the upper tie of the carrier. Fig. 12 is a side view and Fig. 13 a front end view. Fig. 14 is a side view of the carrier and bolt when removed from the body with means shown for holding the hammer-cam in cocking position. Fig. 15 shows the holding or locking means for the hammer-cam disengaged from the cam in the closed position of the bolt. Fig. 16 is a view of the opposite side of the carrier and bolt in the closed position showing the catch for holding the cam when the bolt is in this position. Fig. 17 is a back view of the cam showing the catch last named. Figs. 14 to 17 show an arrangement adapted to be operated by a thumb piece on the sear instead of by means of a trigger as in Fig. 1. Figs. 18 and 19 are plan and side views of the sear. Figs. 20 and 21 are similar views of the sear lever and Figs. 22 and 23 are similar views of the hammer. Fig. 24 is a side view of the extractor. A modified form of my invention is shown in Figs. 25–34. Fig. 25 is a side elevation somewhat similar to Fig. 1 without a trigger. Fig. 26 is a side elevation of the bolt withdrawn, the hammer being in the cocked position. Fig. 27 is an end view of the block and lever detached. Fig. 28 is a side view of the block and lever detached. Fig. 29 is a plan view of the block with lever removed. Fig. 30 is a front view of the block. Fig. 31 is a plan view of the bolt slide and breech end of the rifle showing bolt-stop, ejector, lever-lock and antifriction wheel for facilitating cartridge extraction. Fig. 32 is a plan view illustrating the ejector in its acting position. Fig. 33 is a side elevation of bolt slide showing the ejector and Fig. 34 is a sectional end view of bolt slide with bolt in position.

Referring to Figs. 1–24 $a$ is the bolt carrier adapted to slide in guides in the body $b$. $c$ is a non-rotatable bolt-head which is locked into the breech $d$ by means of the lugs $e$ on the rotatable block $f$. These features are to be found in my previous constructions. According to my present improvements the rotatable block $f$ (seen separate at Fig. 5) is rearwardly extended through a cylindrical socket $g$, with a key-way in it, in the carrier $a$ which is now made without the cylinder for containing a striker as in my previous constructions. The block $f$ has the usual lever $h$ and locking lugs $e$ and at the rear of its extension is a key $i$ preferably placed on the upper right-hand quadrant of its periphery. On to the rear end of the said extension beyond the cylindrical socket $g$ of the carrier fits a cam piece $k$ so that the rotation imparted to the block $f$ is also imparted by the said key $i$ to the cam piece $k$ which is capable of turning in a curved recess $j$ in the floor of the carrier. The cam piece $k$ is shown detached in Figs. 6 and 7. The office of the cam piece $k$ is to cock the hammer $l$ which is pivoted to the upper tie $m$ of the bolt, the upper tie being that part of the bolt which extends along the top from the bolt head to the carrier. To each of these it is fixed by longitudinal tenons dropping into slots in each and held therein by transverse pins. It thus secures together the various parts and forms a case for the main spring and provides a pivot for the hammer. The tie $m$ is shown detached at Figs. 11, 12 and 13. $n$ is a main spring. The tail of the hammer $l$ over-lies the acting end of the main spring $n$ and cramps it when the hammer is raised into the position shown in Figs. 1, 3, 14, 15 and 16. The transverse pin which holds the rear tenon of the upper tie in the carrier is preferably held in its place by a flat spring attached to the carrier so that it can be withdrawn by a thumb piece to strip the action and snap back again into its place without a screw being necessary. The hammer is held in its cocked position by means of a sear $o$ which is pivoted on the carrier at $p$ and engages with the hammer by means of its bent $q$. The sear has an upward tendency imparted by means of a spring $r$ shown in dotted lines in Fig. 16. The safety catch $u$ slides on the carrier and may be advanced from the position shown at Fig. 1 until it overlies and rigidly retains depressed the tail of the lever $s$. In this position the enlarged end of the spring $t$ engages in the nick $v$ and retains the safety catch in position until purposely released. It is desirable that the block should be held in the open position when it is out of the breech and held shut when it is in the breech and the hammer-cam provides means by which these desiderata may be effected. A convenient arrangement which I have selected for illustration comprises on the one hand an upright spring $w$ (see Figs. 16 and 17) on the body the bent top of which engages the depression $x$ on the cam when in the closed position and on the opposite side on the carrier is pivoted a lever $y$ (Figs. 14 and 15). This lever $y$ has an extension $z$ adapted to engage in a nick in the front of the cam where the cam extends beyond the carrier when in open position. The lever $y$ has a backward tendency given to it by the spring $l$ but on the bolt being advanced into the breech the curved side 2 of the breech tips up the lever $y$ and withdraws the extension $z$ from its nick in the cam and allows the latter, together with the block $f$, to be turned by the lever $h$. By means of this arrangement the block is held in the open position until the bolt has been thrust home into the breech and is automatically freed at the right moment. Other mechanism for locking the hammer-cam may be provided if desired, the object being to prevent any turning of the block $f$ by the lever $h$ before the bolt is thrust home into the breech. 3 is the cartridge extractor (see detached in Fig. 24) pivoted in the carrier. 4 is the slot in the front end of the latter in which the extractor works. 5 is the bolt stop. 6 is the firing pin mounted in the block $f$ and preferably provided with a cam 7, by means of which it is withdrawn as the block $f$ is rotated prior to opening the breech. 8 are claws at the front of the upper tie $m$ which serve as a holder for the cartridge clip while the cartridges are being inserted into the magazine. The fire-arm may be discharged either by a trigger (see Fig. 1) operating on a vertical rod 9 beneath the lever $s$ so as to cause it to disengage the sear $o$, or the sear may be disengaged by being pressed directly on the knob 10 attached thereto. The main spring $n$ causes the hammer to fall on the end of the firing pin 6 when the sear is disengaged. It will be noticed that the weapon is cocked by the lifting of the lever to unlock the bolt and not by the movement of the bolt in a forward direction as was the case in my earlier mechanisms.

In the modification shown in Figs. 25-34 the parts are mostly the same as above described but the lever $h$ instead of being attached to the block $f$ is attached to, or formed in one with the cam $k$. This permits of several improvements connected with the manufacture of the parts. For instance the block $f$ can now be made of finer steel and is more easy to make than when the lever $h$ is attached to it and the lugs $e$ can be made stronger, therefore the double locking grip may be dispensed with. To hold the lever $h$ and cam locked in the position shown in Fig. 25 a small spring plunger 11 is provided sliding in a recess in one of the cheeks of the breech and having a rounded projecting end to engage with a depression in the front of the lever $h$. In the cheek on the opposite side will be seen in Figs. 31 and 34 a small antifriction wheel or roller 14. As the front of the hammer cam $k$ descends on the left where the lever $h$ is lifted on the right in opening the action the cam impinges against the periphery of this wheel just in rear of its center and thereby gives primary extraction by starting the withdrawal of the bolt. This starting may be modified to any extent desired by the shaping of the front of the cam. If an inclined plane is preferred instead of a wheel a sloping piece of hardened steel may be inserted in its place giving primary extraction in the usual manner. It would be possible to substitute a striker for the pivoted hammer and retract it by means of the cam but this would necessitate greater length in the bolt and for many reasons the blow of a hammer is preferable to the blow of an endwise movable striker. It is obvious that instead of the slide-ribs or guides being on the body and the grooves in the carrier, this arrangement may be reversed, but in that case the ribs on the carrier should be near the bottom (see Fig. 34). In this arrangement it is necessary to have a movable ejector instead of the fixed one I have formerly employed. This movable ejector which is clearly shown in Figs. 31, 32 and 33, consists of a thin piece of metal 12 pivoted on the body and rocked into position at the proper time by a projection 13 on the carrier pressing the tail of the ejector outward at the right moment. The hammer and sear are shown without casing but a casing may be added without difficulty if thought desirable, but as all dust and dirt can be wiped off by the hand or picked out with the point of a bullet it is probable that the open action will be preferred.

What I claim and desire to secure by Letters Patent of the United States is;—

1. In a small arm breech mechanism constructed on the block bolt principle above indicated a bolt carrier wherein are mounted so as to be movable therewith, a firing mechanism, a rotatable locking block, a rearward extension on the latter, a cam-piece fitting onto the extension and keyed thereto so as to rotate therewith, means for rotating the locking block and the cam-piece, whereby the unlocking of the bolt and the cocking of the firing mechanism may be effected simultaneously, and a sear for retaining the firing mechanism when cocked.

2. In a small arm breech mechanism constructed on the block bolt principle above indicated a bolt carrier wherein are mounted so as to be movable therewith, a firing mechanism, a rotatable locking block a rearward extension on the latter, a cam-piece for cocking the firing mechanism, fitting onto the extension and keyed thereto so as to rotate therewith, a lever attached to the cam-piece for rotating the same and the locking block, and a sear for retaining the firing mechanism substantially as described.

3. In a small arm breech mechanism constructed on the block bolt principle above indicated a bolt carrier wherein are mounted so as to be movable therewith, a firing mechanism comprising a pivoted hammer and a firing pin, a rotatable locking block, a rearward extension on the latter, a cam-piece fitted onto the extension and keyed thereto so as to rotate therewith, means for rotating the locking block and cam-piece so as to cock the hammer and a sear for keeping the hammer cocked substantially as described.

4. In a small arm breech mechanism constructed on the block bolt principle above indicated wherein a bolt carrier is employed having mounted therein, a firing mechanism, a rotatable locking block, a cam-piece connected therewith for cocking the firing mechanism, a lever attached to the cam for rotating the same and the locking block, and a sear for retaining cocked the firing mechanism, a retaining device for the cam-piece consisting of a spring catch fitted into the cheek of the breech substantially as described.

5. In a small arm breech mechanism constructed on the block bolt principle above indicated wherein a bolt carrier is employed having mounted therein, a firing mechanism, a rotatable locking block, a cam-piece connected therewith for cocking the firing mechanism, means for rotating the locking block and the cam-piece and a sear for retaining the firing mechanism, an antifriction wheel in the cheek of the breech for the cam-piece to bear against to start the bolt block when rotated substantially as described.

6. In a small arm breech mechanism constructed on the block bolt principle above indicated wherein a bolt carrier is employed having mounted therein, a firing mechanism, a rotatable locking block, a cam-piece connected therewith for cocking the firing mechanism, means for rotating the locking block and the cam-piece and a sear for retaining the firing mechanism, an ejector pivoted onto the body and actuated by a cam shaped projection on the carrier substantially as described.

7. In a small arm breech mechanism constructed on the block bolt principle above indicated wherein a bolt carrier is employed having mounted therein, a firing mechanism, a rotatable locking block, a cam-piece connected therewith for cocking the firing mechanism, means for rotating the locking block and the cam-piece and a sear for retaining the firing mechanism, a rocking lever mounted on the carrier so as to engage the sear and trigger mechanism carried on the body and arranged so as to actuate the lever and the sear for discharging the weapon.

In testimony whereof I have signed my name to this specification in the presence of two subscribing witnesses.

PHILIP THOMAS GODSAL.

Witnesses:
ALFRED S. BISHOP,
ARTHUR D. DINSDALE.